No. 846,711. PATENTED MAR. 12, 1907.
N. O. WOLD.
SOD CUTTER.
APPLICATION FILED AUG. 31, 1906.
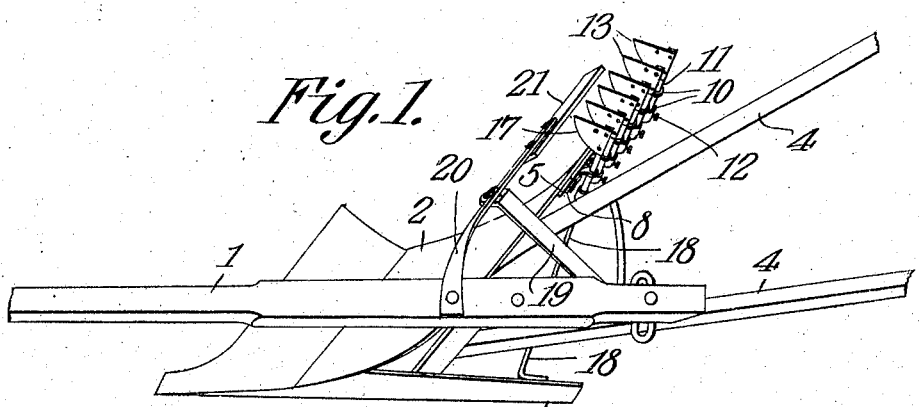
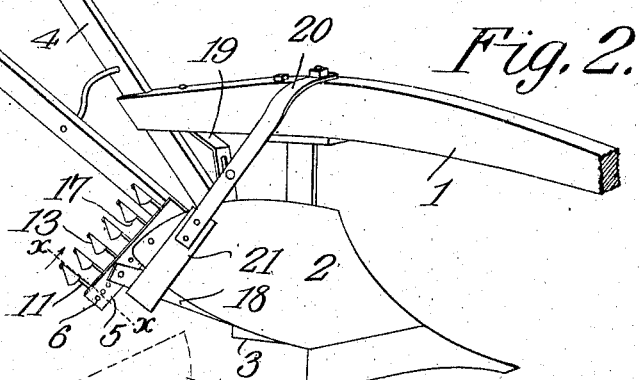
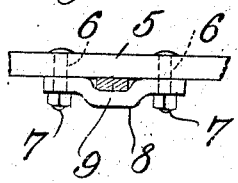
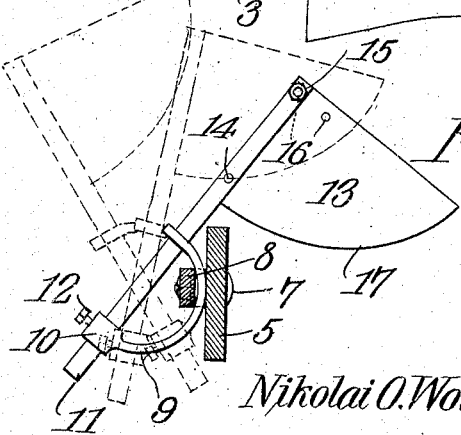
WITNESSES:
Nikolai O. Wold INVENTOR
By C. A. Snow & Co.
ATTORNEYS
THE NORRIS PETERS CO., WASHINGTON, D. C.

UNITED STATES PATENT OFFICE.

NIKOLAI O. WOLD, OF SHEYENNE, NORTH DAKOTA.

SOD-CUTTER.

No. 846,711.      Specification of Letters Patent.      Patented March 12, 1907.

Application filed August 31, 1906. Serial No. 332,827.

*To all whom it may concern:*

Be it known that I, NIKOLAI O. WOLD, a citizen of the United States, residing at Sheyenne, in the county of Eddy and State of North Dakota, have invented a new and useful Sod-Cutter, of which the following is a specification.

This invention relates to sod-cutters, and its object is to provide a device of this character in the form of an attachment for plows whereby the sod can be cut as rapidly as upturned.

Another object is to provide a compact sod-cutter which can be readily secured to a plow and which is capable of adjustment to meet various conditions.

With these and other objects in view the invention consists of certain novel features of construction and combinations of parts, which will be hereinafter more fully described, and pointed out in the claims.

In the accompanying drawings is shown the preferred form of the invention.

In said drawings, Figure 1 is a top perspective view of a plow having the sod-cutter and guide attached thereto. Fig. 2 is a side perspective view thereof. Fig. 3 is a section through the upper end of the cutting attachment on the line *x x* of Fig. 2, and Fig. 4 is an edge view of a portion of the base of the cutter and showing a yoke in section.

Referring to the figures by characters of reference, 1 is the beam, 2 the moldboard, 3 the landside, and 4 the handles of a plow. Bolted or otherwise secured to the rear end of the moldboard is a base-strip 5, having series of openings 6 therein, in which are located bolts 7, which detachably engage the end portions of straps 8. Each of these straps extends across a curved yoke 9, having alining eyes 10 at the ends thereof, in which is mounted a stem 11. A set-screw 12 serves to clamp the stem into any position to which it may be moved.

A cutting-blade 13 is pivotally connected to the stem, as at 14, a bolt 15 serving to hold the blade against movement. This bolt is adapted to be placed in either of the apertures 16 formed in the blade. The blade is substantially triangular in form, its cutting edge 17, however, being rounded so as to produce a thorough shearing action upon the sod. A brace-strip 18 connects the base 5 with the landside 3.

An angular longitudinally-slotted brace 19 is bolted or otherwise fastened to the beam 1 and to an arm 20, extending from the beam and downward over the moldboard. A holding-plate 21 is secured to the end of this arm and adjacent the rear end of the moldboard.

In using this cutter, the plow is drawn forward and the upturned sod is directed between the mold board and the holding-plate 21 and onto the blades 13. These blades will thoroughly cut the sod, which will be held firmly thereagainst by the plate 21. By mounting each blade 13 in the manner shown and described said blade can be adjusted, as shown by dotted lines in Fig. 2, merely by loosening the yoke 9. By releasing stem 11 from the set-screw it can be partly rotated so as to bring the blade to a desired inclination. These various adjustments are all found to be advantageous in arranging the attachment for use upon different kinds of plows.

In the accompanying drawings is shown the preferred form of the invention; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. An attachment for plows comprising a base, an arcuate yoke adjustable in the direction of its curve upon the base, and a blade carried by the yoke.

2. An attachment for plows comprising a base, an arcuate yoke adjustable in the direction of its curve upon the base, and a blade adjustably connected to the yoke.

3. An attachment for plows comprising a base, an arcuate yoke adjustable in the direction of its curve upon the base, and a blade adjustably connected to the ends of the yoke.

4. An attachment for plows comprising a base, an arcuate yoke adjustable in the direction of its curve upon the base, a rotatable sod-cutting blade adjustably connected to the yoke, and means for holding said blade against rotation.

5. An attachment for plows comprising a base, an arcuate yoke adjustable in the direction of its curve upon the base, a cutting-blade slidably and rotatably mounted within the yoke, and means for holding the blade against movement in relation to the yoke.

6. An attachment for plows comprising a base, an arcuate yoke adjustable in the direction of its curve upon the base, a stem slidably and rotatably mounted within the ends of the yoke, means for holding the stem against movement within the yoke, and a cutting-blade adjustably secured to the stem.

7. The combination with a plow; of a sod-cutting attachment therefor comprising blades connected to and extending beyond the plow, and means for directing upturned sods upon the blades.

8. The combination with a plow; of a sod-cutting attachment therefor comprising a base, cutting-blades adjustably connected to the base, and means for directing upturned sod upon the blades.

9. The combination with a plow having a moldboard; of a sod-cutting attachment therefor comprising a base secured to the moldboard, yokes adjustably mounted upon the base, cutting-blades extending beyond the moldboard, stems thereon adjustably mounted in the yokes, and means for directing upturned sod along the moldboard and upon the blades.

In testimony that I claim the foregoing as my own I have hereto affixed my signature in the presence of two witnesses.

NIKOLAI O. WOLD.

Witnesses:
S. D. SEVERTSON,
JENS ALM.